US010280873B2

(12) United States Patent
Katsura

(10) Patent No.: US 10,280,873 B2
(45) Date of Patent: May 7, 2019

(54) FUEL TANK SYSTEM

(71) Applicant: DENSO CORPORATION, Kariya, Aichi-pref. (JP)

(72) Inventor: Ryou Katsura, Kariya (JP)

(73) Assignee: DENSO CORPORATION, Kariya (JP)

(*) Notice: Subject to any disclaimer, the term of this patent is extended or adjusted under 35 U.S.C. 154(b) by 55 days.

(21) Appl. No.: 14/994,498

(22) Filed: Jan. 13, 2016

(65) Prior Publication Data

US 2016/0245244 A1 Aug. 25, 2016

(30) Foreign Application Priority Data

Feb. 23, 2015 (JP) .................................. 2015-33041

(51) Int. Cl.
*F02D 19/02* (2006.01)
*F02M 21/02* (2006.01)

(52) U.S. Cl.
CPC ....... *F02M 21/0212* (2013.01); *F02D 19/023* (2013.01); *F02D 19/027* (2013.01); *F02M 21/0224* (2013.01); *F02M 21/0245* (2013.01); *F02M 21/0275* (2013.01); *Y02T 10/32* (2013.01)

(58) Field of Classification Search
CPC ........... F02M 21/0212; F02M 21/0224; F02M 21/0245; F02M 37/0088; F02D 19/023; F02D 19/027; Y02T 10/32
USPC .................................. 137/571; 123/527, 525
See application file for complete search history.

(56) References Cited

U.S. PATENT DOCUMENTS

| 4,664,144 A | * | 5/1987 | Lemmon | B60K 15/077 137/44 |
|---|---|---|---|---|
| 5,168,891 A | * | 12/1992 | Green | B60K 15/077 137/114 |
| 5,983,932 A | * | 11/1999 | Wagner | B60K 15/03 123/509 |
| 6,792,966 B2 | * | 9/2004 | Harvey | B60K 15/077 123/514 |
| 6,845,782 B2 | * | 1/2005 | Osterkil | B60K 15/077 137/1 |
| 7,614,854 B2 | * | 11/2009 | Palvolgyi | B60K 15/077 141/126 |
| 2005/0087236 A1 | * | 4/2005 | Woo | B60K 15/03 137/572 |

(Continued)

FOREIGN PATENT DOCUMENTS

| JP | 2001012326 A | * | 1/2001 | ........... B60K 15/077 |
|---|---|---|---|---|
| JP | 2001-260668 | | 9/2001 | |

(Continued)

*Primary Examiner* — Jason K Niesz
*Assistant Examiner* — James Hakomaki
(74) *Attorney, Agent, or Firm* — Nixon & Vanderhye P.C.

(57) ABSTRACT

A fuel tank system stores liquefied gas fuel to be supplied to an engine. The liquefied gas fuel is refueled to the fuel tank system by a fueling equipment. The fuel tank system includes: a first tank part having a connector portion connected with the fueling equipment and defining a first storage chamber into which the liquefied gas fuel sent from the fueling equipment flows; a second tank part defining a second storage chamber that stores the liquefied gas fuel separately from the first storage chamber; and a sending part that raises a pressure of the liquefied gas fuel stored in the first tank part and that sends the liquefied gas fuel with the raised pressure to the second tank part.

11 Claims, 10 Drawing Sheets

(56) References Cited

U.S. PATENT DOCUMENTS

| | | | |
|---|---|---|---|
| 2005/0224057 A1 | 10/2005 | Tokumaru et al. | |
| 2006/0042606 A1* | 3/2006 | Van Dyke | B60K 15/03006 123/527 |
| 2015/0075623 A1* | 3/2015 | Tokumaru | F02M 21/0221 137/1 |

FOREIGN PATENT DOCUMENTS

| | | |
|---|---|---|
| JP | 2004-084808 | 3/2004 |
| JP | 2014-066230 | 4/2014 |

* cited by examiner

FUEL TANK SYSTEM

CROSS REFERENCE TO RELATED APPLICATION

This application is based on Japanese Patent Application No. 2015-33041 filed on Feb. 23, 2015, the disclosure of which is incorporated herein by reference in its entirety.

TECHNICAL FIELD

The present disclosure relates to a fuel tank system storing liquefied gas fuel to be supplied to an engine.

BACKGROUND

WO 2004/016934 A1 describes a fuel supply system having two fuel tanks which store dimethyl ether (DME) as fuel. DME fuel is sent to an internal-combustion engine from each of the fuel tanks. The flow rate of DME fuel which returns from the internal-combustion engine to each fuel tank is controlled so that the residual quantity of fuel is almost the same between the fuel tanks.

SUMMARY

Generally, a fueling equipment supplies liquefied gas fuel such as DME fuel to a fuel tank before the fuel tank becomes empty. In WO 2004/016934 A1, the temperature in the fuel tank is relatively high, when fuel is refueled by the fueling equipment, due to the liquefied gas fuel returned to the fuel tank from the engine. In this case, it is difficult to quickly lower the temperature in the fuel tank, even while the fuel tank is cooled by evaporation latent heat of the liquefied gas fuel sent from the fueling equipment. Therefore, time will be taken to raise the inflow speed of the liquefied gas fuel into the fuel tank by securing a difference between the pressure of liquefied gas fuel sent from the fueling equipment and the internal pressure of the fuel tank. As a result, the refueling takes a long time.

It is an object of the present disclosure to provide a fuel tank system for which time taken for refueling liquefied gas fuel can be shortened.

A fuel tank system stores liquefied gas fuel to be supplied to an engine, and the liquefied gas fuel is refueled to the fuel tank system by a fueling equipment. According to an aspect of the present application, the fuel tank system includes: a first tank part having a connector portion connected with the fueling equipment and defining a first storage chamber into which the liquefied gas fuel sent from the fueling equipment flows; a second tank part defining a second storage chamber that stores the liquefied gas fuel separately from the first storage chamber; and a sending part that raises a pressure of the liquefied gas fuel stored in the first tank part and that sends the liquefied gas fuel to the second tank part.

Accordingly, when refueling the liquefied gas fuel with the fueling equipment, the liquefied gas fuel stored in the first tank part can be sent to the second tank part, due to the sending part that raises the pressure of the liquefied gas fuel. Because the amount of the liquefied gas fuel remaining in the first tank part decreases by sending the liquefied gas fuel to the second tank part, the temperature of the first storage chamber of the first tank part falls quickly by the evaporation latent heat of the liquefied gas fuel sent from the fueling equipment. As a result, a difference between the internal pressure of the first tank part and the pressure of liquefied gas fuel sent from the fueling equipment is secured, and the inflow speed of the liquefied gas fuel to the first tank part increases quickly. Therefore, it becomes possible to shorten the time period taken for the refueling.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
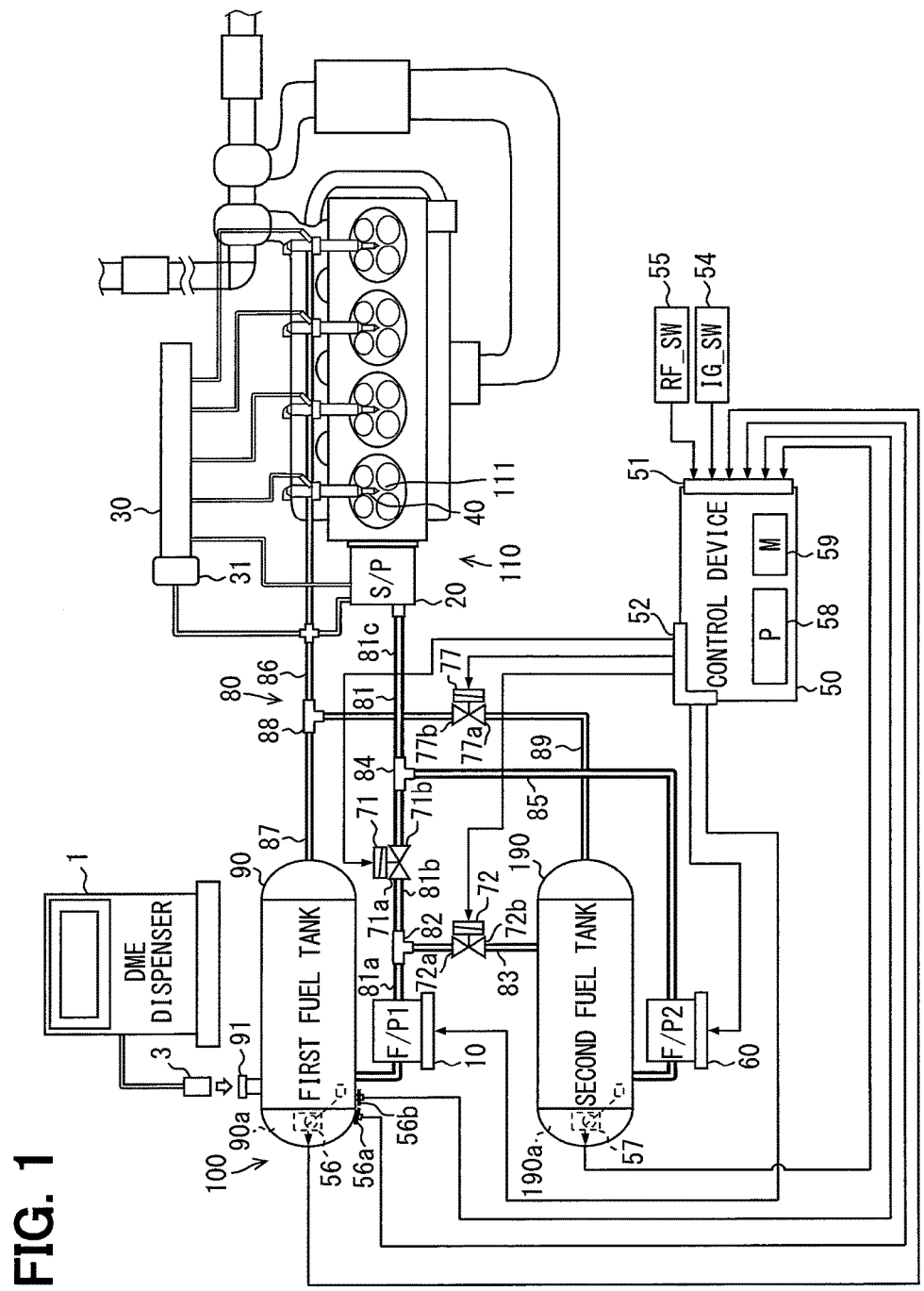
FIG. 1 is a schematic view illustrating a fuel tank system according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A fuel tank system 100 shown in FIG. 1 is mounted in a vehicle with an internal-combustion engine 110. The fuel tank system 100 stores dimethyl ether (DME) which is a kind of liquefied gas fuel to be supplied to the internal-combustion engine 110. The internal-combustion engine 110 is, for example, a diesel engine. The DME fuel injected from an injector 40 arranged at each cylinder is compressed within each cylinder. The internal-combustion engine 110 changes the thermal energy of the DME fuel to a driving force by compression and combustion in each combustion chamber 111. The internal-combustion engine 110 has a supply pump (S/P) 20 and a common-rail 30 in addition to the injector 40.

The supply pump 20 is, for example, a plunger pump, and is driven with the internal-combustion engine 110. The supply pump 20 further pressurizes the DME fuel supplied from the fuel tank system 100. The supply pump 20 pumps the DME fuel with the raised pressure to the common-rail 30.

The common-rail 30 is a tubular component made of metal material such as steel material. The common-rail 30 accumulates the DME fuel pressurized by the supply pump 20, and maintains the pressure of the DME fuel. The common-rail 30 supplies DME fuel to each injector 40. The common-rail 30 has a reducing valve 31. The reducing valve 31 is opened when the fuel pressure in the common-rail 30 exceeds a predetermined maximum pressure.

The injector 40 supplies the DME fuel from the common-rail 30 into each cylinder of the internal-combustion engine 110. The injector 40 is inserted in a penetration hole formed in the head part of the internal-combustion engine 110, such that the injection hole is exposed to the combustion chamber 111. The injector 40 injects DME fuel from the injection hole exposed to the combustion chamber 111 based on a control signal inputted.

The fuel tank system 100 includes a first fuel tank 90, a second fuel tank 190, a first feed pump (F/P1) 10, a second feed pump (F/P2) 60, a fuel line 80, a supply cutoff valve 71, a transfer cutoff valve 72, a flowing-back cutoff valve 77, and a control device 50.

The first fuel tank 90 and the second fuel tank 190 are pressure vessels, for example, having cylindrical shape and made of metal. The first fuel tank 90 and the second fuel tank 190 respectively define a first storage chamber 90a and a second storage chamber 190a storing DME fuel. Since the second fuel tank 190 is located outside of the first fuel tank 90, the first storage chamber 90a and the second storage chamber 190a do not overlap mutually. That is, the second storage chamber 190a is formed independently (separately) from the first storage chamber 90a. The first fuel tank 90 and the second fuel tank 190 are located at positions different from each other in a vehicle. A capacity of the first fuel tank 90 and a capacity of the second fuel tank 190 are approximately the same. DME fuel is pressurized and liquefied by applying a pressure according to the fuel vapor pressure. The first fuel tank 90 has a refueling opening 91 to be connected with a DME dispenser 1. A safety valve (not shown) is prepared in each of the first fuel tank 90 and the second fuel tank 190. The safety valve opens when pressure in each fuel tank 90, 190 exceeds a predetermined maximum pressure. The predetermined maximum pressure is set, for example as about 1.8 MPa.

The first feed pump 10 and the second feed pump 60 are electric pumps arranged outside of the first fuel tank 90 and the second fuel tank 190. The first feed pump 10 sucks the DME fuel stored by the first fuel tank 90 using the power of electric motor, and the pressure of the DME fuel is raised by adding a feed pressure (for example, 1-2 MPa) to the DME fuel.

The second feed pump 60 sucks the DME fuel stored in the second fuel tank 190 using the power of electric motor, and the pressure of the DME fuel is raised by adding a feed pressure (for example, 1-2 MPa) that is approximately the same as the first feed pump 10. Both the first feed pump 10 and the second feed pump 60 send the DME fuel with the raised pressure to the supply pump 20 of the internal-combustion engine 110.

The fuel line 80 is a piping for circulating DME fuel between the first fuel tank 90 and the second fuel tank 190, and the internal-combustion engine 110. The fuel line 80 may be a hose made of rubber reinforced by polyester or aramid. The fuel line 80 includes a first supply line 81, a transfer line 83, a second supply line 85, and a return fuel line 86.

The first supply line 81 forms a fuel channel which supplies DME fuel from the first fuel tank 90 to the first feed pump 10, and a fuel channel which supplies DME fuel from the first feed pump 10 to the supply pump 20. The first supply line 81 has a transfer branch part 82 and a unification part 84. The transfer branch part 82 and the unification part 84 are formed, for example, of T-shape joint component. The first supply line 81 is defined to have a first section 81a from the first fuel tank 90 to the transfer branch part 82, a second section 81b from the transfer branch part 82 to the unification part 84, and a third section 81c from the unification part 84 to the supply pump 20. The transfer branch part 82 branches the first section 81a of the first supply line 81 between the second section 81b and the transfer line 83. The unification part 84 makes the second section 81b of the first supply line 81 and the second supply line 85 to join with each other, as the third section 81c.

The transfer line 83 connects the transfer branch part 82 and the second fuel tank 190. The transfer line 83 forms a fuel channel from the first feed pump 10 to the second fuel tank 190, together with the first section 81a of the first supply line 81.

The second supply line 85 connects the second fuel tank 190 and the unification part 84. The second supply line 85 forms a fuel channel which supplies DME fuel to the second feed pump 60 from the second fuel tank 190. In addition, the second supply line 85 forms a fuel channel which supplies DME fuel to the supply pump 20 from the second feed pump 60 together with the third section 81c of the first supply line 81.

The return fuel line 86 forms a fuel channel which returns the DME fuel discharged from the internal-combustion engine 110 as return fuel to each of the first fuel tank 90 and the second fuel tank 190. Specifically, the return fuel may be surplus fuel discharged from the common-rail 30 by opening the reducing valve 31, leak fuel discharged without being injected by each injector 40, or/and leak fuel discharged from the supply pump 20. The return fuel line 86 has a return branch part 88, a first tank line 87, and a second tank line 89. The return branch part 88 is formed, for example, of T-shape joint component. The first tank line 87 connects the return branch part 88 and the first fuel tank 90. The second tank line 89 connects the return branch part 88 and the second fuel tank 190.

Each of the supply cutoff valve 71, the transfer cutoff valve 72, and the flowing-back cutoff valve 77 is a two-way valve having a valve main part and an actuator which controls the valve main part to circulate DME fuel. The valve main part of the supply cutoff valve 71 has an inflow port 71a and an outflow port 71b each of which is connected with the second section 81b of the first supply line 81. The supply cutoff valve 71 is able to intercept a flow of the DME fuel through the second section 81b based on a control signal inputted into the actuator.

The valve main part of the transfer cutoff valve 72 has an inflow port 72a and an outflow port 72b each of which is connected with the transfer line 83. The transfer cutoff valve 72 is able to intercept a flow of the DME fuel through the transfer line 83 based on a control signal inputted into the actuator.

The valve main part of the flowing-back cutoff valve 77 has a first port 77a and a second port 77b each of which is connected with the second tank line 89. The transfer cutoff valve 72 is able to intercept a flow of the DME fuel through the second tank line 89 based on a control signal inputted into the actuator.

The control device 50 includes a processor 58 as an arithmetic circuit, RAM, and a flash memory 59 as a non-volatile rewritable storage medium. The control device 50 has the input unit 51 and the output unit 52. The input unit 51 acquires manipulate signal from plural operation elements including an ignition switch 54 and a refueling switch 55, in addition to output signal output from plural in-vehicle sensors such as a first fuel sensor 56, an inside pressure sensor 56a, a temperature sensor 56b, and a second fuel sensor 57.

The fuel sensors 56, 57 measure the residual quantity of the DME fuel in the fuel tanks 90, 190, respectively, by detecting the position of float which follows the liquid surface of the liquefied DME fuel upward and downward using a magneto-electric conversion element or a variable resister. The first fuel sensor 56 is located in the first storage chamber 90a, and is attached to the wall part of the first fuel tank 90. The measurement value of the residual quantity of the DME fuel in the first fuel tank 90 measured by the first fuel sensor 56 is inputted into the input unit 51 as a signal. The second fuel sensor 57 is located in the second storage chamber 190a, and is attached to the wall part of the second fuel tank 190. The measurement value of the residual quantity of the DME fuel in the second fuel tank 190 measured by the second fuel sensor 57 is inputted into the input unit 51 as a signal.

The inside pressure sensor 56a and the temperature sensor 56b are attached to the bottom wall of the first fuel tank 90. The inside pressure sensor 56a includes a diaphragm part made of metal and receiving the pressure, and a distortion gauge which change the deformation of the diaphragm part caused by the pressure into an electric signal. The inside pressure sensor 56a outputs an electric signal according to the fuel pressure in the first fuel tank 90 to the control device 50.

The temperature sensor 56b includes a thermistor, and the resistance of the thermistor is changed with the temperature. The temperature sensor 56b outputs an electric signal according to the fuel temperature in the first fuel tank 90 to the control device 50.

The ignition switch 54 is operated to direct a start or a stop of the internal-combustion engine 110. When an operator such as driver operates the ignition switch 54, a start signal or a stop signal of the internal-combustion engine 110 is input into the input unit 51 as a manipulate signal.

The refueling switch 55 is operated to notify the refueling start to the fuel tank system 100. Specifically, an operator such as driver operates the refueling switch 55, before the DME dispenser 1 is connected to the fuel tank system 100. When the refueling switch 55 is operated, a refueling start signal which notifies a refueling start is inputted into the input unit 51 as a manipulate signal.

The output unit 52 is connected to each actuator of the first feed pump 10 and the second feed pump 60, the supply cutoff valve 71, the transfer cutoff valve 72, and the flowing-back cutoff valve 77. The control device 50 generates a control signal to be outputted from the output unit 52 based on the control program memorized by the flash memory 59 and each signal information acquired through the input unit 51.

The operation of the fuel tank system 100 at a normal time is described, where DME fuel is supplied to the internal-combustion engine 110 in an operation state. When the internal-combustion engine 110 is operated, the supply cutoff valve 71 and the flowing-back cutoff valve 77 are made in the open state. In contrast, the transfer cutoff valve 72 is in the closed state. In this state, the first feed pump 10 and the second feed pump 60 are operated to pump the DME fuel stored in each fuel tank 90, 190 through the first supply line 81 and the second supply line 85 to the supply pump 20 of the internal-combustion engine 110.

The operation of the fuel tank system 100 at a refueling time is described, where DME fuel is refueled to the first fuel tank 90. The DME dispenser 1 connected to the refueling opening 91 of the first fuel tank 90 fuels DME fuel into the first fuel tank 90. First, the details of the DME dispenser 1 are explained.

The DME dispenser 1 stands in, for example, a gas station to supply DME fuel. The DME dispenser 1 has a refueling nozzle 3. The refueling nozzle 3 is liquid-tightly and gas-tightly connected to the refueling opening 91 of the first fuel tank 90. The DME dispenser 1 applies a refueling pressure to the DME fuel stored in a storage tank (not shown) installed in the gas station, to pump the DME fuel to the refueling nozzle 3. The DME fuel sent out from the DME dispenser 1 flows into the first fuel tank 90 through the refueling nozzle 3 and the refueling opening 91, such that the DME fuel is sent to the first fuel tank 90 and the second fuel tank 190.

Figure 2:
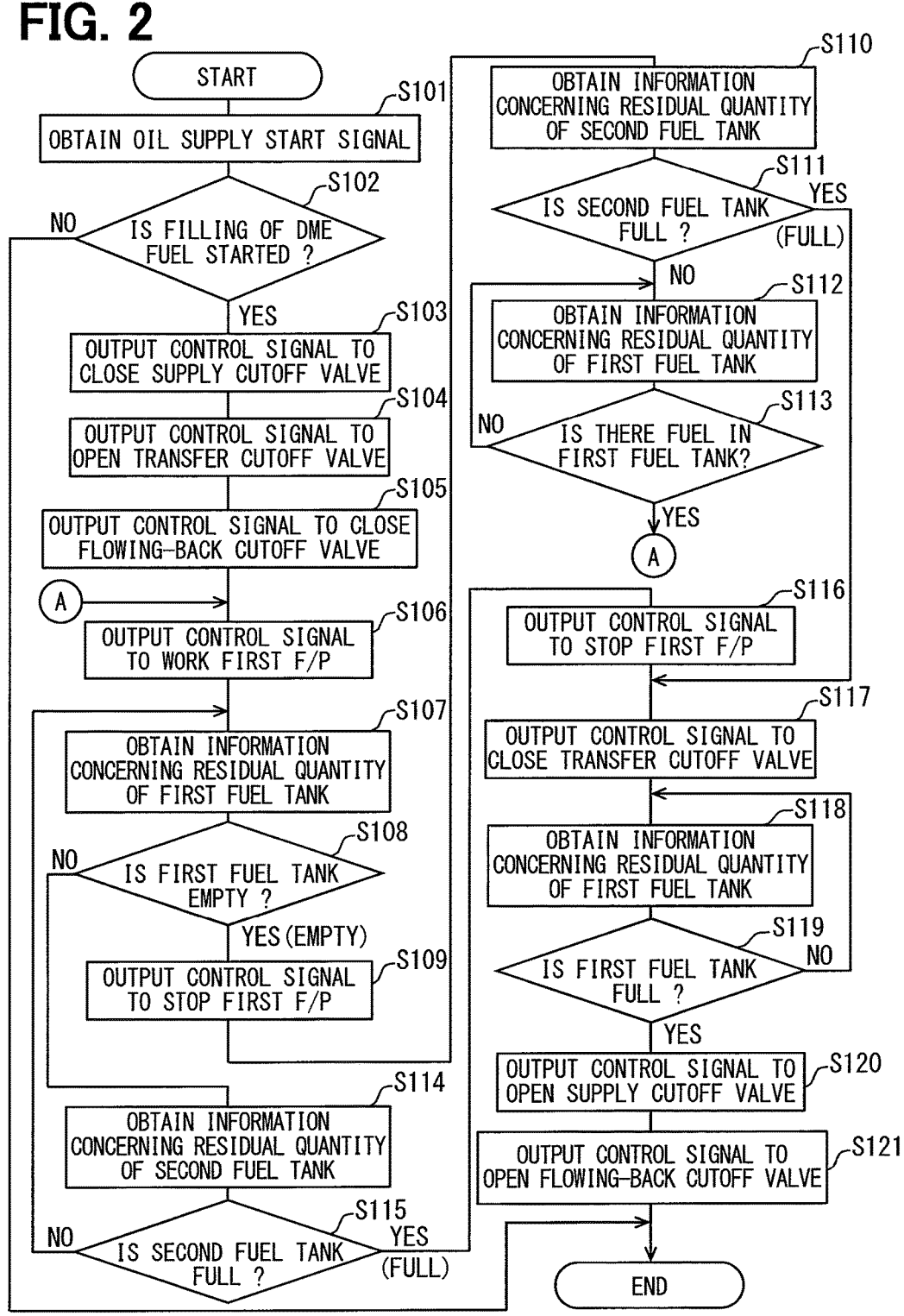
FIG. 2 is a flow chart of control process carried out by a processor of a control device of the first embodiment.

In the fuel tank system 100, before the refueling by the DME dispenser 1 is started, the DME fuel which remains in the first fuel tank 90 is sent to the second fuel tank 190. The processor 58 of the control device 50 executes processing shown in FIG. 2, while such a transfer operation is performed, and the processing is explained referring to FIG. 1. The processing shown in FIG. 2 is started by the control device 50, on condition that the stop signal is input, for example, by operating the ignition switch 54. The supply pump 20 of the internal-combustion engine 110, the first feed pump 10 and the second feed pump 60 of the fuel tank system 100 are made into a halt condition based on the stop signal.

In S101, the refueling start signal is obtained based on the operation to the refueling switch 55, and the processor progresses to S102. In S102, it is determined whether the refueling of DME fuel is started based on the refueling start signal acquired in S101. When the refueling start signal is not acquired in S102, it is determined that the refueling of DME fuel is not started, and a series of processings are ended.

When the refueling start signal is acquired in S102, it is determined that the refueling of DME fuel is started, and the processor progresses to S103-S105 to change the distribution channel of the DME fuel in the fuel line 80. In S103, a control signal is outputted to the actuator of the supply cutoff valve 71, and the processor progresses to S104. The control signal outputted in S103 is a signal to close the supply cutoff valve 71 that is usually in the open state. The first supply line 81 is changed from a communication state to an interception state by S103.

In S104, a control signal is outputted to the actuator of the transfer cutoff valve 72, and the processor progresses to S105. The control signal outputted in S104 is a signal to open the transfer cutoff valve 72 that is usually in the closed state. The transfer line 83 is changed from an interception state to a communication state by S104.

In S105, a control signal is outputted to the actuator of the flowing-back cutoff valve 77, and the processor progresses to S106. The control signal outputted in S105 is a signal to close the flowing-back cutoff valve 77 that is usually in the open state. The second tank line 89 is changed from a communication state to an interception state by S105. As a result, the DME fuel is restricted from flowing from the second fuel tank 190 to the first fuel tank 90 through the return fuel line 86.

In S106, in order to transport DME fuel to the second fuel tank 190 from the first fuel tank 90 through the transfer line 83, the control signal which works the first feed pump 10 is outputted to the pump 10, and the processor progresses to S107. By S106, the pressure of the DME fuel stored in the first fuel tank 90 is raised by the first feed pump 10 to a pressure higher than the vapor pressure of the DME fuel currently stored in the second fuel tank 190. The DME fuel with the raised pressure is sent to the second fuel tank 190 through the first section 81a and the transfer line 83. At this time, a flow rate of the DME fuel sent to the second fuel tank 190 from the first fuel tank 90 may be larger than a flow rate of the DME fuel which flows into the first fuel tank 90 from the DME dispenser 1.

In S107, signals inputted from the first fuel sensor 56, the inside pressure sensor 56a, and the temperature sensor 56b are acquired as information concerning the residual quantity in the first fuel tank 90, and the processor progresses to S108. In S108, it is determined whether DME fuel remains in the first fuel tank 90 based on the signals acquired in S107. When one of the three conditions explained below is met, it is determined that the first fuel tank 90 is empty, and the processor will progress to S109. In S108, it is determined that the first fuel tank 90 is empty when any two of the three conditions are met, or when all of the three conditions are met.

The first condition is whether the DME fuel in the first fuel tank 90 has evaporated. Specifically, the gas/liquid determination of DME fuel is performed based on the tank pressure in the first fuel tank 90 acquired from the inside pressure sensor 56a, and the tank temperature in the first fuel tank 90 acquired from the temperature sensor 56b. The gas/liquid determination is made using saturated vapor pressure (refer to FIG. 3). When the tank pressure is lower than the saturated vapor pressure corresponding to the tank temperature, it is considered that the DME fuel in the first fuel tank 90 is in the evaporated state.

The second condition is whether the load of the first feed pump 10 pumping the DME fuel is lowered. Specifically, when the present revolving speed of the first feed pump 10 is over a predetermined speed used as a threshold value, the DME fuel in the liquid phase disappears from the first fuel tank 90, and is regarded as that the load is reduced. The revolving speed used as a threshold value is beforehand memorized by the flash memory 59, for example.

The third condition is whether the liquid surface is notably lowered in the first fuel tank 90. Specifically, when the liquid surface detected by the first fuel sensor 56 is lower than a predetermined surface height as a threshold value, the DME fuel in the liquid phase disappears from the first fuel tank 90, and is regarded as that the liquid surface is lowered. The surface height used as a threshold value is beforehand memorized by the flash memory 59, for example.

When it is determined that the first fuel tank 90 is empty in S108, the processor progresses to S109. In S109, the control signal which stops the first feed pump 10 is outputted to the pump 10, and the processor progresses to S110. Based on the control signal outputted in S109, the transfer of DME fuel into the second fuel tank 190 from the first fuel tank 90 is interrupted or stopped temporarily.

In S110, based on the signal inputted from the second fuel sensor 57, the residual quantity of the DME fuel in the second fuel tank 190 is obtained, and the processor progresses to S111. In S111, it is determined whether the second fuel tank 190 is changed into the full state by comparing the ratio of residual quantity in the second fuel tank 190 acquired in S110 with a predetermined threshold value (for example, 85%). In S111, when the percentage of residual quantity is 85% or more, it is determined that the second fuel tank 190 is in a full state, and the processor progresses to S117. In S111, when the percentage of residual quantity is less than 85%, it is determined that the second fuel tank 190 is not in the full state, and the processor progresses to S112.

In S112, the information concerning the residual quantity in the first fuel tank 90 is acquired, similarly to S107, and the processor progresses to S113. In S113, it is determined whether DME fuel remains in the first fuel tank 90. S113 differs from S108 so that the start and the stop of the first feed pump 10 are not repeated.

Specifically, in S113, in order to provide hysteresis, when the following two conditions are satisfied, it is determined that DME fuel remains in the first fuel tank 90. The first condition is whether the tank pressure is sufficiently higher than the saturated vapor pressure corresponding to tank temperature. The second condition is whether the liquid surface height in the first fuel tank 90 is over a predetermined height higher than the threshold value of S108. The predetermined height is beforehand memorized by, for example, the flash memory 59.

When it is determined that DME fuel does not remain in the first fuel tank 90 in S113, S112 and S113 are repeated to wait until DME fuel increases in the first fuel tank 90. When the amount of DME fuel to be sent to the second fuel tank 190 increases, it is determined that there is DME fuel in the first fuel tank 90 in S113, and the processor returns to S106. Thus, the first feed pump 10 suspended temporarily works again. When S112 and S113 are repeated for a predetermined time period, it may presume that refueling is stopped and may shift to S120 and S121.

After it is determined that the first fuel tank 90 is not empty in S108, the residual quantity of the DME fuel in the second fuel tank 190 is obtained in S114, similarly to S110, and the processor progresses to S115. In S115, it is determined whether the second fuel tank 190 is changed into the full state, similarly to S111. When the percentage of residual quantity is less than 85%, it is determined that the second fuel tank 190 is not in the full state in S115, and the processor returns to S107. When the percentage of residual quantity is 85% or more, it is determined that the second fuel tank 190 is in the full state in S115, and the processor progresses to S116. In S116, the control signal which stops the first feed pump 10 is outputted to the pump 10, similarly to S109, and the processor progresses to S117. Accordingly, the transfer of DME fuel into the second fuel tank 190 from the first fuel tank 90 is ended.

In S117, a control signal is outputted to the actuator of the transfer cutoff valve 72, and the processor progresses to S118. The control signal outputted in S117 is a signal to close the transfer cutoff valve 72 that was in the open state. The transfer line 83 is changed from a communication state to an interception state by S117.

In S118, the residual quantity of the DME fuel in the first fuel tank 90 is obtained based on the signal inputted from the first fuel sensor 56, and the processor progresses to S119. In S119, it is determined whether the first fuel tank 90 is changed to the full state by comparing the ratio of residual quantity in the first fuel tank 90 acquired in S118 with a predetermined threshold value (for example, 85%). In S119, when the percentage of residual quantity is less than 85%, it is determined that the first fuel tank 90 is not in the full state, and S118 and S119 are repeated until the first fuel tank 90 becomes the full state. When the percentage of residual quantity exceeds 85%, it is determined that the first fuel tank 90 is in the full state, and the processor progresses to S120.

In S120, a control signal is outputted to the actuator of the supply cutoff valve 71, and the processor progresses to S121. The control signal outputted in S120 is a signal to open the supply cutoff valve 71 from the closed state. The first supply line 81 is changed from an interception state to a communication state by S120.

In S121, a control signal is outputted to the actuator of the flowing-back cutoff valve 77, and a series of processings are ended. The control signal outputted in S121 is a signal to open the flowing-back cutoff valve 77 from the closed state. The second tank line 89 is changed from an interception state to a communication state by S121.

According to the first embodiment, when the DME dispenser 1 supplies DME fuel, the pressure of the DME fuel is raised by the operation of the first feed pump 10, such that the DME fuel stored in the first fuel tank 90 becomes transportable to the second fuel tank 190. For example, the first feed pump 10 can pump up the DME fuel remained about 20% in the first fuel tank 90, and can transport the DME fuel to the second fuel tank 190 where DME fuel remains about 10%.

Figure 3:
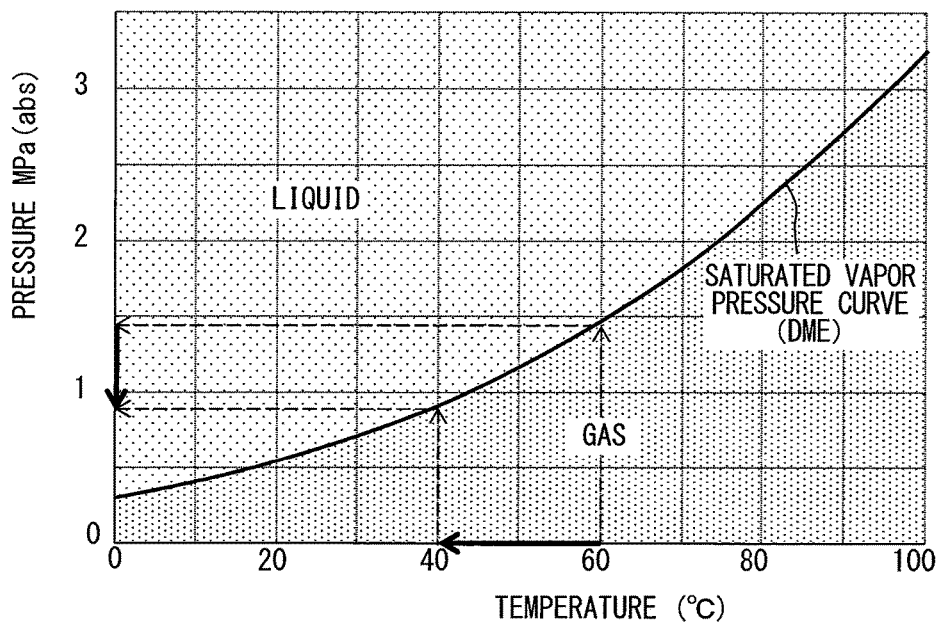
FIG. 3 is a graph illustrating a relationship between temperature and pressure at a time of refueling, with a saturated vapor pressure line of DME fuel.

Thus, the amount of DME fuel which remains in the first fuel tank 90 decreases, and the thermal capacity of the first fuel tank 90 will become small. Therefore, as shown in FIG. 3, the temperature in the first fuel tank 90 raised to about 60° C. with return fuel can be quickly lowered to about 40° C. by the evaporation latent heat of the DME fuel sent from the DME dispenser 1. As a result, the pressure in the first fuel tank 90 declines from about 1.5 MPa to less than 1.0 MPa. Thus, the difference between the pressure in the first fuel tank 90 and the refueling pressure of the DME fuel sent from the DME dispenser 1 is secured, and the flow speed of the DME fuel to the first fuel tank 90 may increase quickly. Therefore, it becomes possible to shorten refueling time.

According to the first embodiment, the amount of DME fuel sent to the second fuel tank 190 from the first fuel tank 90 with the first feed pump 10 is larger than that flowing into the first fuel tank 90 from the DME dispenser 1. Therefore, when the total amount of the DME fuel stored by the two fuel tanks 90, 190 is larger than the volume of the second fuel tank 190, the second fuel tank 190 will be in the full state before the first fuel tank 90 becomes in the full state. Thus, the refueling time can be restricted from becoming long because DME fuel can be quickly sent to the second fuel tank 190 from the first fuel tank 90. Moreover, since the inflow amount from the DME dispenser 1 to the first fuel tank 90 is larger than the amount of transfer, the pressure in the first fuel tank 90 becomes low. Therefore, the length of refueling time does not pose a problem, and does not serve as a demerit of this embodiment, either.

According to the first embodiment, the transfer of DME fuel is started by operating the refueling switch 55. In the case where refueling is not being performed, the amount of DME fuel stored in the first fuel tank 90 can be made approximately equal to that stored in the second fuel tank 190. Therefore, in the case where the internal-combustion engine 110 is in an operation state, sufficient quantity of DME fuel can be certainly sent from each of the fuel tanks 90, 190 to the internal-combustion engine 110 as the fuel tank system 100.

According to the first embodiment, when the first fuel tank 90 becomes an empty state, the transfer of the DME fuel by the first feed pump 10 will be temporarily interrupted. Therefore, failure resulting from racing the first feed pump 10 becomes avoidable.

According to the first embodiment, while the first feed pump 10 usually supplies DME fuel to the internal-combustion engine 110 from the first fuel tank 90, the first feed pump 10 sends DME fuel from the first fuel tank 90 to the second fuel tank 190 at the time of refueling. Therefore, the refueling time can be shortened without adding components for the transfer from the first fuel tank 90 to the second fuel tank 190 in the fuel tank system 100.

According to the first embodiment, the flowing-back cutoff valve 77 is disposed in the second tank line 89 of the return fuel line 86, so as to restrict the DME fuel from returning to the first fuel tank 90 through the return fuel line 86 to the second fuel tank 190. By closing the flowing-back cutoff valve 77, the return fuel line 86 disconnects the two fuel tanks 90, 190 from each other. Thus, the DME fuel once sent to the second fuel tank 190 can be restricted from returning to the first fuel tank 90.

In the first embodiment, the DME dispenser 1 may correspond to a fueling equipment, the first feed pump 10 may correspond to a sending part, and the control device 50 may correspond to a determination part. Moreover, the supply cutoff valve 71 and the transfer cutoff valve 72 may correspond to a first switch part, the flowing-back cutoff valve 77 may correspond to a regulation part, and the transfer line 83 may correspond to a first transfer line. In addition, the first fuel tank 90 may correspond to a first tank part, the refueling opening 91 may correspond to a connector portion, and the second fuel tank 190 may correspond to a second tank part. The internal-combustion engine 110 may correspond an engine.

(Second Embodiment)

Figure 4:
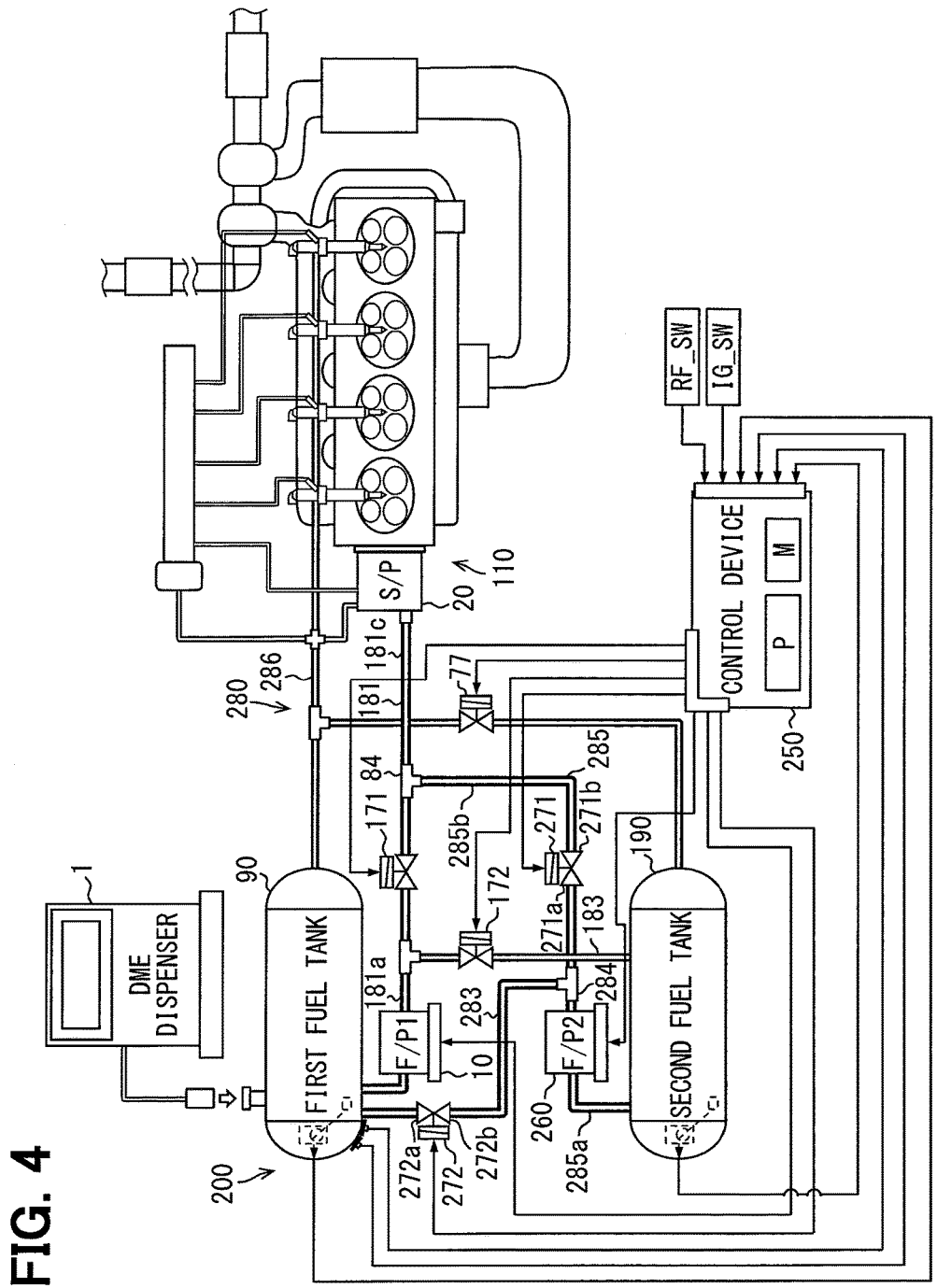
FIG. 4 is a schematic view illustrating a fuel tank system according to a second embodiment.

A second embodiment shown in FIG. 4 is a modification of the first embodiment. A fuel tank system 200 of the second embodiment includes a fuel line 280 that is different from that of the first embodiment. Moreover, the fuel tank system 200 includes a second supply cutoff valve 271 and a second transfer cutoff valve 272 in addition to the first supply cutoff valve 171 and the transfer cutoff valve 72 (refer to FIG. 1) which are substantially the same as the supply cutoff valve 71 and the first transfer cutoff valve 172 of the first embodiment. Furthermore, suction and discharge directions can be reversed in the second feed pump 260 of the second embodiment by reversely rotating the output shaft of electric motor. Hereafter, the details of the fuel tank system 200 are explained.

The fuel line 280 includes a second supply line 285 and a second transfer line 283 in addition to the first supply line 181, the first transfer line 183, and the return fuel line 286 which are approximately the same as the lines 81, 83, and 86 of the first embodiment.

The second supply line 285 is equivalent to the second supply line 85 (refer to FIG. 1) of the first embodiment, and is connected to the unification part 84 between the second fuel tank 190 and the first supply line 181. The second supply line 285 forms a fuel channel which supplies DME fuel to the second feed pump 260 from the second fuel tank 190. The second supply line 285 forms a fuel channel which supplies DME fuel to the supply pump 20 from the second feed pump 260 together with the third section 181c of the first supply line 181. A transfer unification part 284 is formed in the second supply line 285. For convenience, of the second supply line 285, a first section 285a is defined to extend from the second fuel tank 190 to the transfer unification part 284, and a second section 285b is defined to extend from the transfer unification part 284 to the unification part 84. The transfer unification part 284 is formed, for example, of a T-shape joint component. The transfer unification part 284 makes the second transfer line 283 to join the second supply line 285.

The second transfer line 283 is connected between the first fuel tank 90 and the transfer unification part 284. The second transfer line 283 forms a fuel channel from the first feed pump 10 to the second fuel tank 190, together with the first section 285a of the second supply line 285. The fuel channel defined by the second transfer line 283 is different from the fuel channel formed of the first transfer line 183.

Each of the second supply cutoff valve 271 and the second transfer cutoff valve 272 is a two-way valve including a valve main part which circulates DME fuel, and an actuator which controls the valve main part. The second supply cutoff valve 271 is arranged in the second section 285b of the second supply line 285. The inflow port 271a and the outflow port 271b which are connected with the second section 285b, respectively, are prepared in the valve main part of the second supply cutoff valve 271. The second supply cutoff valve 271 can stop a flow of the DME fuel through the second section 285b based on the control signal inputted into the actuator.

The second transfer cutoff valve 272 is arranged at the second transfer line 283. The inflow port 272a and the outflow port 272b which are connected with the second transfer line 283, respectively, are prepared in the valve main part of the second transfer cutoff valve 272. The second transfer cutoff valve 272 can stop a flow of the DME fuel through the second transfer line 283 based on the control signal inputted into the actuator.

The operation of the fuel tank system 200 at a normal time is explained. When the internal-combustion engine 110 is operated, the first supply cutoff valve 171, the second supply cutoff valve 271, and the flowing-back cutoff valve 77 are made in the open state. In contrast, the first transfer cutoff valve 172 and the second transfer cutoff valve 272 are in the closed state. When the first feed pump 10 and the second feed pump 260 operate in the above state, the DME fuel stored in each of the fuel tanks 90, 190 is pumped by the supply pump 20 of the internal-combustion engine 110 through the first supply line 181 and the second supply line 285.

Figure 5:
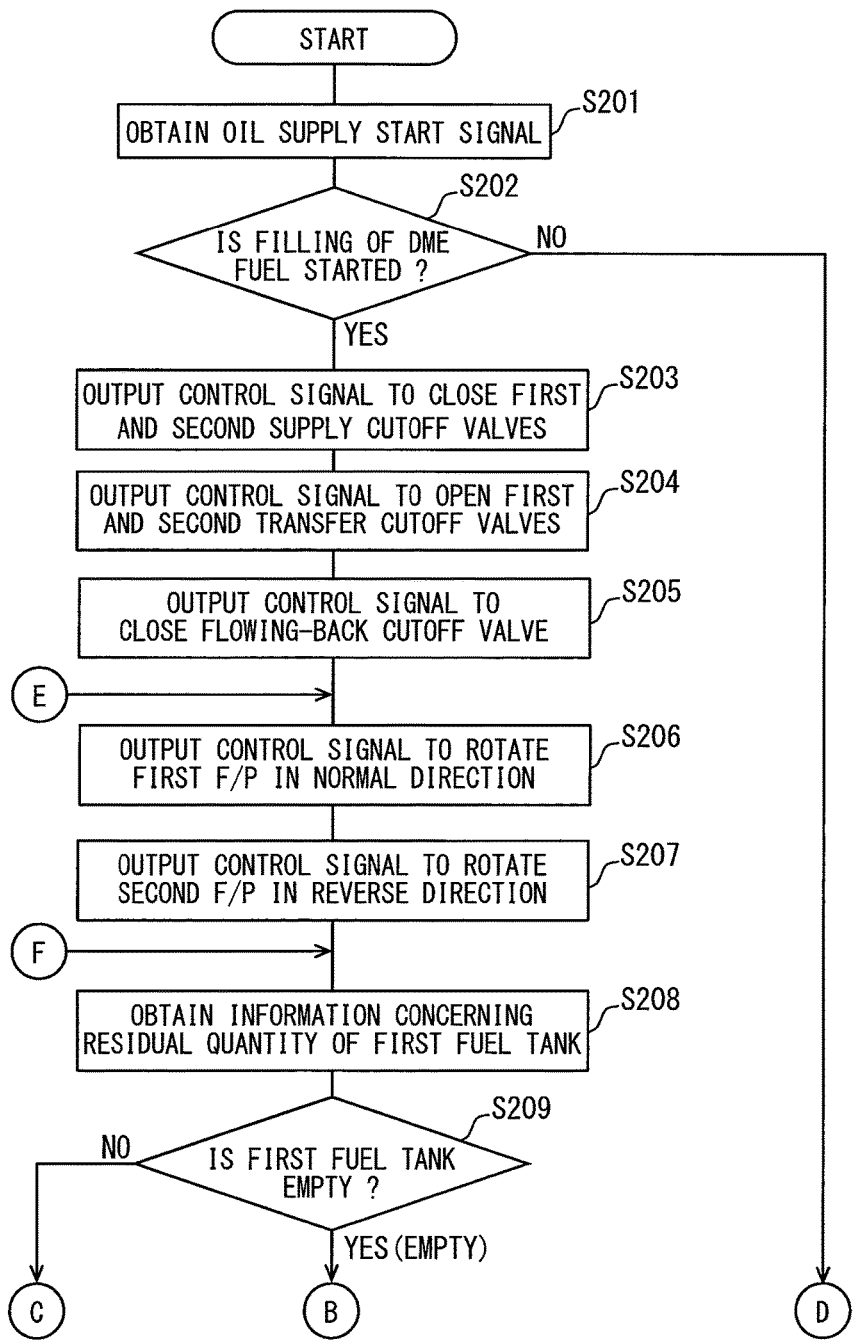
FIG. 5 is a part of a flow chart in the second embodiment.
Figure 6:
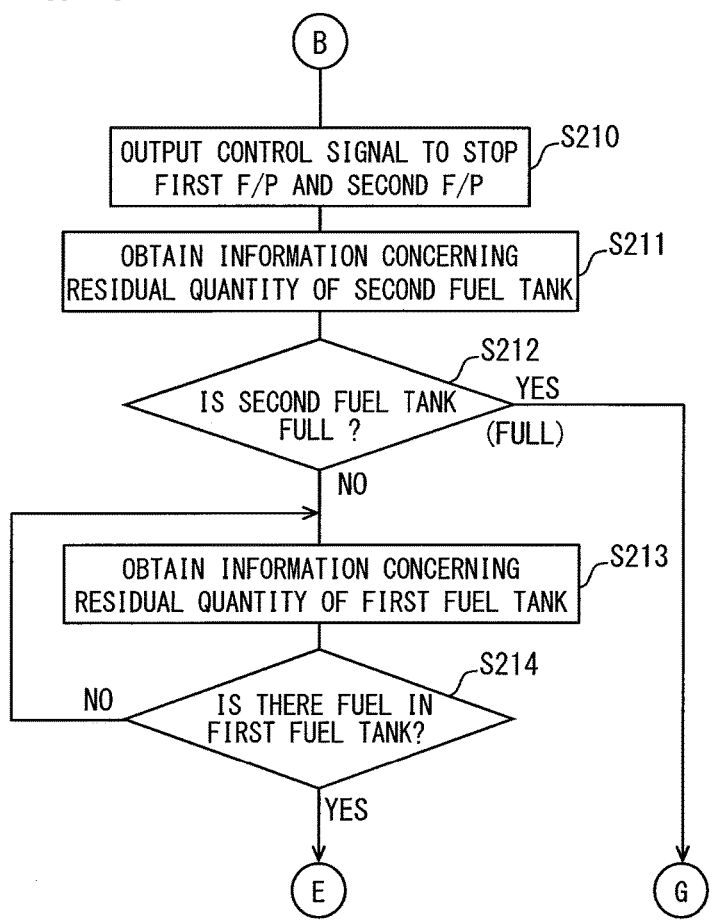
FIG. 6 is a part of the flow chart in the second embodiment.
Figure 7:
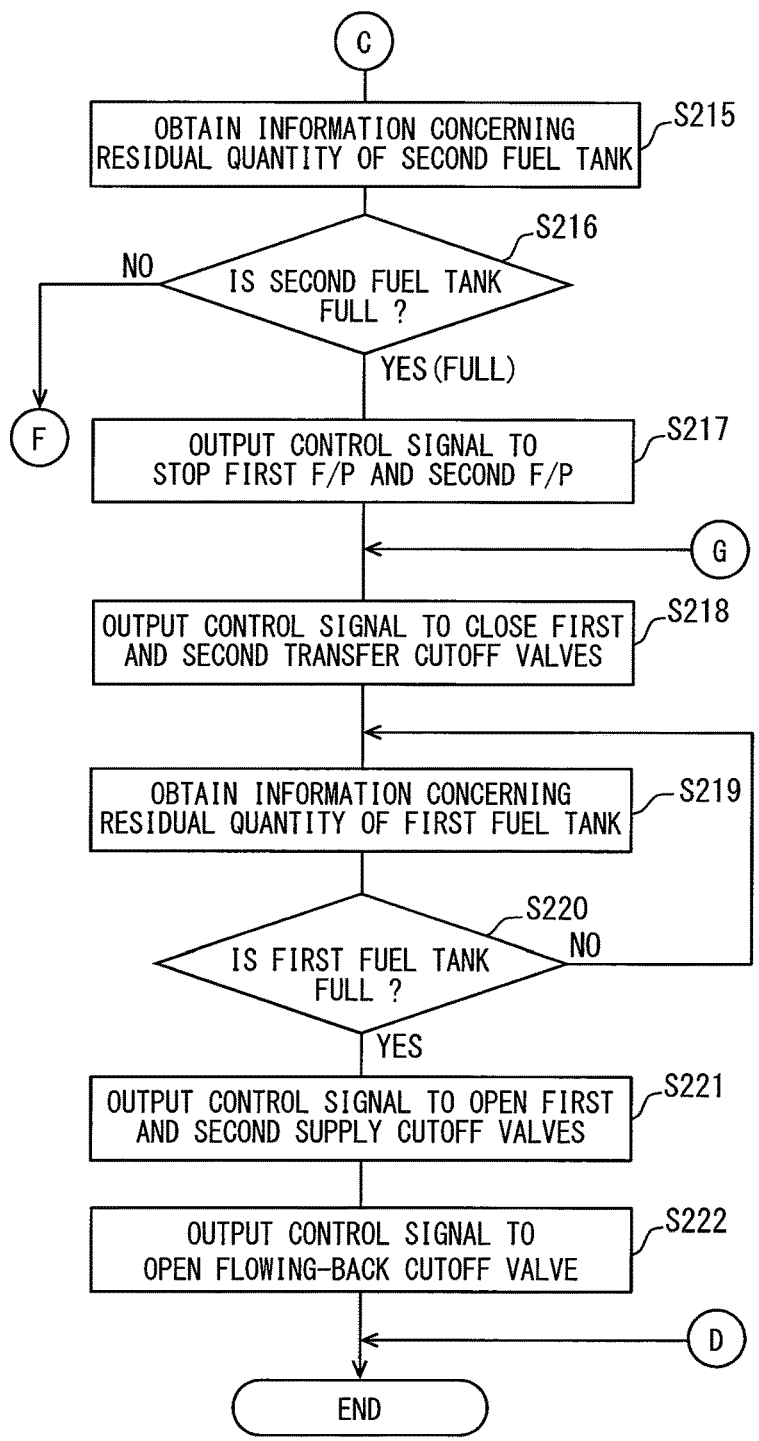
FIG. 7 is a part of the flow chart in the second embodiment.

The operation of the fuel tank system 200 at a time of refueling is explained. At the time of refueling, the first supply cutoff valve 171, the second supply cutoff valve 271, and the flowing-back cutoff valve 77 are set in the closed state. The first transfer cutoff valve 172 and the second transfer cutoff valve 272 are set in the opened state. In the above state, the first feed pump 10 discharges the DME fuel to the same distribution direction as the normal time by rotating the output shaft of electric motor in the same direction (right rotation, normal direction) as the normal time. On the other hand, the second feed pump 260 discharges the DME fuel to a distribution direction opposite to the normal time by reversely rotating the output shaft of electric motor (in the reverse direction) compared with the normal time. Referring to FIG. 4, the details of the processing carried out by the control device 250 of the fuel tank system 200 are explained based on FIG. 5 to FIG. 7.

In S201 and S202, substantially the same processing is carried out with S101 and S102 of the first embodiment (refer to FIG. 2), and the processor progresses to S203. In S203, a control signal is outputted to each actuator of the first supply cutoff valve 171 and the second supply cutoff valve 271, and the processor progresses to S204. The control signal outputted in S203 is a signal to close the first supply cutoff valve 171 and the second supply cutoff valve 271 from the normally open state. Both the first supply line 181 and the second supply line 285 are changed from a communication state to an interception state by S203.

In S204, a control signal is outputted to each actuator of the first transfer cutoff valve 172 and the second transfer cutoff valve 272, and the processor progresses to S205. The control signal outputted in S204 is a signal to open the first transfer cutoff valve 172 and the second transfer cutoff valve 272 from the normally closed state. Both the first transfer line 183 and the second transfer line 283 are changed from an interception state to a communication state by S204. In S205, substantially the same processing is carried out with S105 (refer to FIG. 2) of the first embodiment, and the processor progresses to S206.

In S206, a control signal is output to the first feed pump 10 to rotate the electric motor in the normal direction, such that the feed pump 10 is worked, and the processor progresses to S207. The first feed pump 10 raises the pressure of the DME fuel currently stored in the first fuel tank 90 by S206, and the DME fuel is sent to the second fuel tank 190 through the first section 181a and the first transfer line 183.

In S207, a control signal is output to the second feed pump 260 to rotate the electric motor in the reverse direction, such that the feed pump 260 is worked, and the processor progresses to S208. The second feed pump 260 raises the pressure of the DME fuel currently stored in the first fuel tank 90 by S207, and the DME fuel is sent to the second fuel tank 190 through the second transfer line 283 and the first section 285a of the second supply line 285.

In S208 and S209, substantially the same processing is carried out with S107 and S108 of the first embodiment (refer to FIG. 2). When it is determined that the first fuel tank 90 is in an empty state in S209, the processor progresses to S210. In S210, a control signal to stop rotation of each electric motor is outputted to each of the first feed pump 10 and the second feed pump 260, and the processor progresses to S211.

In S211-S214, substantially the same processing is carried out with S110-S113 of the first embodiment (refer to FIG. 2). When it is determined that the second fuel tank 190 is in a full state in S212, the processor progresses to S218. Moreover, when it is determined that there is fuel in the first fuel tank in S214, the processor returns to S206.

After it is determined that the first fuel tank 90 is not in an empty state in S209, it is determined whether the second fuel tank 190 is changed into the full state in S215 and S216, similarly to S211 and S212. When it is determined that the second fuel tank 190 is not in a full state in S216, the processor returns to S208. On the other hand, when it is determined that the second fuel tank 190 is in a full state at S216, the processor progresses to S217.

In S217, a control signal to stop the first feed pump 10 and the second feed pump 260 is outputted to each feed pump 10, 260, similarly to S210, and the processor progresses to S218. The transfer of DME fuel into the second fuel tank 190 from the first fuel tank 90 is ended by the above.

In S218, a control signal is outputted to each actuator of the first transfer cutoff valve 172 and the second transfer cutoff valve 272, and the processor progresses to S219. The control signal outputted in S218 is a signal to close the first transfer cutoff valve 172 and the second transfer cutoff valve 272 from the open state. Both the first transfer line 183 and the second transfer line 283 are changed from a communication state to an interception state by S218.

In S219 and S220, substantially the same processing is carried out with S118 and S119 of the first embodiment (refer to FIG. 2). When it is determined that the first fuel tank 90 is full in S220, the processor will progress to S221. In S221, a control signal is outputted to each actuator of the first supply cutoff valve 171 and the second supply cutoff valve 271, and the processor progresses to S222. The control signal outputted in S221 is a signal to open the first supply cutoff valve 171 and the second supply cutoff valve 271 from the closed state. Both the first supply line 181 and the second supply line 285 are changed from an interception state to a communication state by S221. In S222, substantially the same processing is carried out with S121 (refer to FIG. 2) of the first embodiment, and a series of processings are ended.

According to the second embodiment, the same effect as the first embodiment is achieved. Therefore, the difference between the pressure in the first fuel tank 90 and the refueling pressure of the DME fuel sent from the DME dispenser 1 can be secured. Thus, the flow speed of the DME fuel to the first fuel tank 90 is raised quickly, and it becomes possible to shorten refueling time.

According to the second embodiment, not only the first feed pump 10 but the second feed pump 260 is used for the transfer of DME fuel into the second fuel tank 190 from the first fuel tank 90. Therefore, the flow speed of the DME fuel sent to the second fuel tank 190 from the first fuel tank 90 increases more than the flow speed of the DME fuel which flows into the first fuel tank 90 from the DME dispenser 1. Therefore, the refueling time can be shortened by the quick transfer from the first fuel tank 90 into the second fuel tank 190.

In the second embodiment, the control device 250 may correspond to a determination part, and the second feed pump 260 may correspond to a feed section. Moreover, the first supply cutoff valve 171 and the first transfer cutoff valve 172 may correspond to a first switch part, and the second supply cutoff valve 271 and the second transfer cutoff valve 272 may correspond to a second switch part.

(Third Embodiment)

Figure 8:
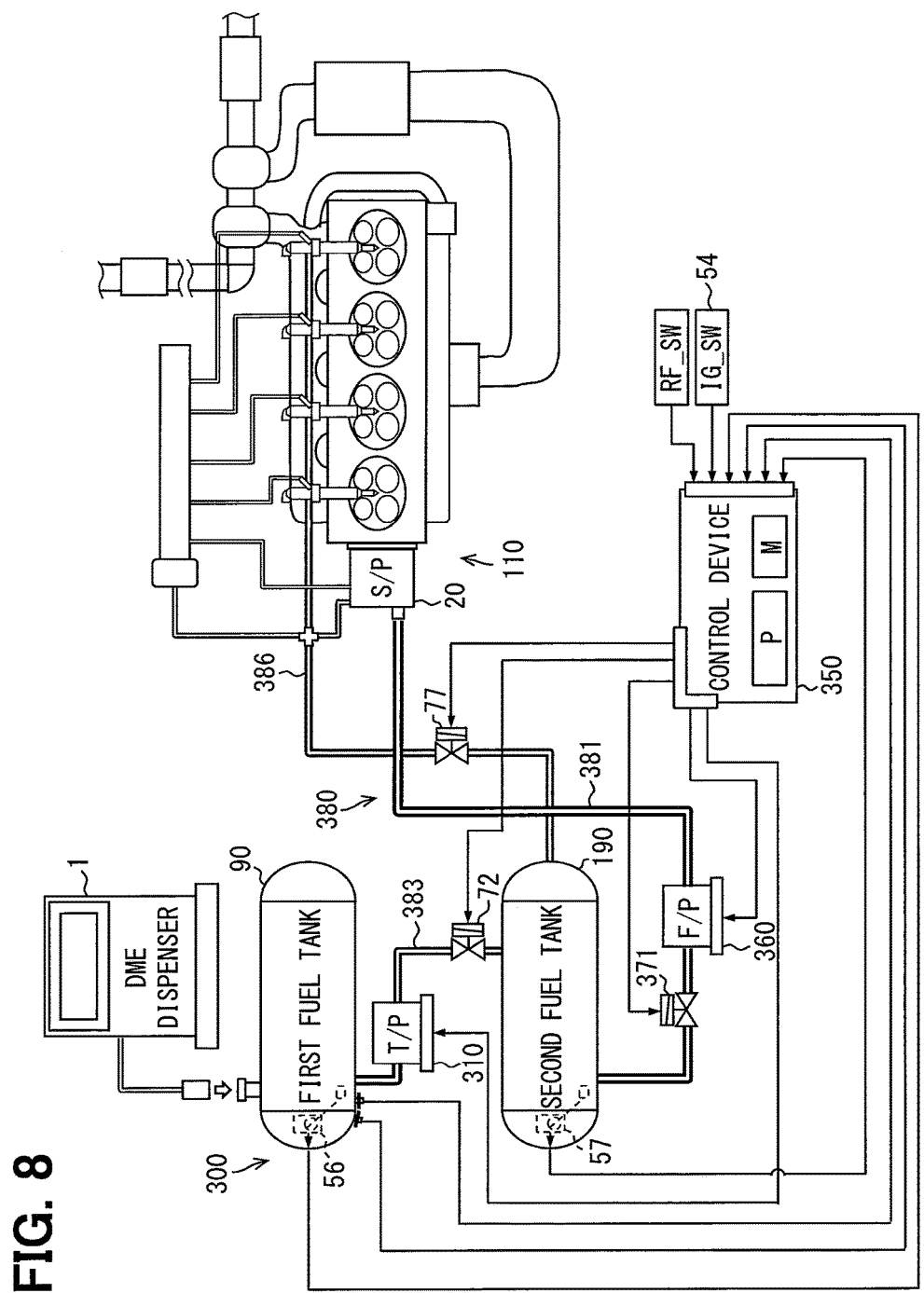
FIG. 8 is a schematic view illustrating a fuel tank system according to a third embodiment.

A third embodiment shown in FIG. 8 is another modification of the first embodiment. In a fuel tank system 300 of the third embodiment, DME fuel is supplied to the supply pump 20 only from the second fuel tank 190, not directly from the first fuel tank 90. The fuel tank system 300 includes the transfer pump 310 and the feed pump 360 respectively replaced with the first feed pump 10 and the second feed pump 60 of the first embodiment. In addition, the fuel tank system 300 includes a fuel line 380 differing from that of the first embodiment.

The transfer pump 310 draws the DME fuel currently stored by the first fuel tank 90, and pumps the DME fuel into the second fuel tank 190. The transfer pump 310 sends liquefied gas fuel to the second fuel tank 190 from the first fuel tank 90 so that the residual quantity of the DME fuel in the second fuel tank 190 may increase more than the residual quantity of the DME fuel in the first fuel tank 90.

The feed pump 360 draws the DME fuel currently stored by the second fuel tank 190, and raises the pressure of DME fuel by applying the feed pressure (for example, 1-2 MPa). The feed pump 360 pumps the DME fuel with the raised pressure to the supply pump 20 of the internal-combustion engine 110. The flow speed of the DME fuel pumped by the feed pump 360 is made approximately the same as the total flow speed of the pumps 10 and 60 (refer to FIG. 1) of the first embodiment.

The fuel line 380 includes the transfer line 383, the supply line 381, and the return fuel line 386. The transfer line 383 is connected between the first fuel tank 90 and the second fuel tank 190. The transfer pump 310 and the transfer cutoff valve 72 are arranged in the transfer line 383. The transfer line 383 forms a fuel channel from the first fuel tank 90 to the transfer pump 310, and a fuel channel from the transfer pump 310 to the second fuel tank 190.

The supply line 381 connects the second fuel tank 190 and the supply pump 20. The feed pump 360 and the supply cutoff valve 371 are arranged in the supply line 381. The supply line 381 forms a fuel channel from the second fuel tank 190 to the feed pump 360 and a fuel channel from the feed pump 360 to the supply pump 20.

The supply cutoff valve 371 is equivalent to the supply cutoff valve 71 (refer to FIG. 1) of the first embodiment, and is located between the second fuel tank 190 and the feed pump 360 on the supply line 381. The supply cutoff valve 371 can stop a flow of the DME fuel flowing through the supply line 381.

The return fuel line 386 connects the internal-combustion engine 110 and the second fuel tank 190. The return fuel line 386 forms a fuel passage which returns the DME fuel only into the second fuel tank 190, among the first fuel tank 90 and the second fuel tank 190, as return fuel discharged from the internal-combustion engine 110. The flowing-back cutoff valve 77 is arranged in the return fuel line 386.

The operation of the fuel tank system 300 at a normal time is explained. When the internal-combustion engine 110 is operated, the transfer cutoff valve 72, the supply cutoff valve 371, and the flowing-back cutoff valve 77 are altogether made in the open state. The DME fuel stored by the second fuel tank 190 is pumped by the supply pump 20 through the supply line 381 by the operation of the feed pump 360 under such a state.

Figure 9:
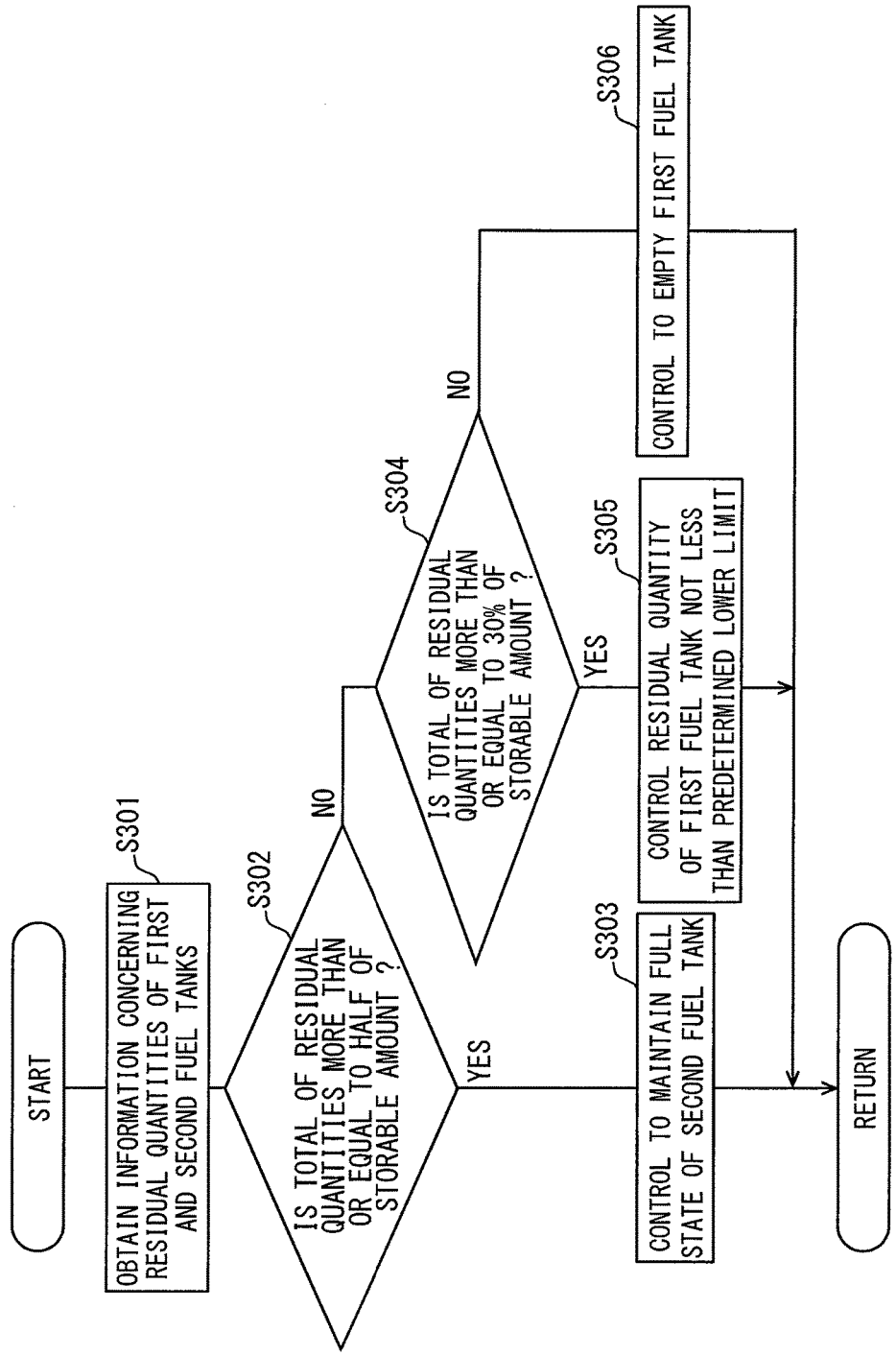
FIG. 9 is a flow chart of control process carried out while a vehicle travels in the third embodiment.

The details of the processing carried out by the control device 350 of the fuel tank system 300 are explained based on FIG. 9, referring to FIG. 8. The processing shown in FIG. 9 is started by the control device 350, for example, on condition that the starting signal is acquired by operating the ignition switch 54, and repeated until a stop signal is acquired.

In S301, the residual quantity of the DME fuel in each of the first fuel tank 90 and the second fuel tank 190 is acquired based on the signal inputted from the first fuel sensor 56 and the second fuel sensor 57, and the processor progresses to S302. In S302, it is determined whether the total of the residual quantity of the DME fuel in the fuel tanks 90 and 190 is more than or equal to half of the storable amount of DME fuel in the fuel tank system 300. When it is determined that the total of the residual quantity of the DME fuel in the fuel tanks 90 and 190 is more than or equal to half of the storable amount of DME fuel in the fuel tank system 300 in S302, the processor progresses to S303. A transfer of the DME fuel by the transfer pump 310 is controlled in S303 to maintain the full state of the second fuel tank 190.

After it is determined that the total of the residual quantity of the DME fuel in the fuel tanks 90 and 190 is not more than or equal to half of the storable amount of DME fuel in the fuel tank system 300 in S302, it is determined whether the total of the residual quantity of the DME fuel is larger than or equal to 30% of the storable amount of DME fuel in the fuel tank system 300, in S304. When it is determined that the total of the residual quantity of the DME fuel is larger than or equal to 30% of the storable amount in the fuel tank system 300 in S304, the processor progresses to S305. A transfer of the DME fuel by the transfer pump 310 is controlled in S305 so that the residual quantity of the first fuel tank 90 is not less than a predetermined lower limit. The lower limit set for the first fuel tank 90 may be changed, for example, according to the residual quantity of the second fuel tank 190. This lower limit can be suitably set to a higher value, in case where inconvenience arises to a traveling of the vehicle due to, for example, weight difference between the first fuel tank 90 and the second fuel tank 190.

When it is determined that the total of the residual quantity of DME fuel is less than 30% of the storable amount of the fuel tank system 300 in S304, the processor progresses to S306. In S306, a transfer of the DME fuel by the transfer pump 310 is controlled to increase the mileage of the vehicle at the maximum, so that the first fuel tank 90 will be in an empty state. In this way, it becomes possible to exhaust DME fuel by bringing the residual quantity of the first fuel tank 90 to close to 0% as much as possible. In the case where the total of residual quantity is less than 30%, the problem of weight difference can be reduced. Moreover, the threshold value used for the determination of S302 and S304 can be changed suitably.

Figure 10:
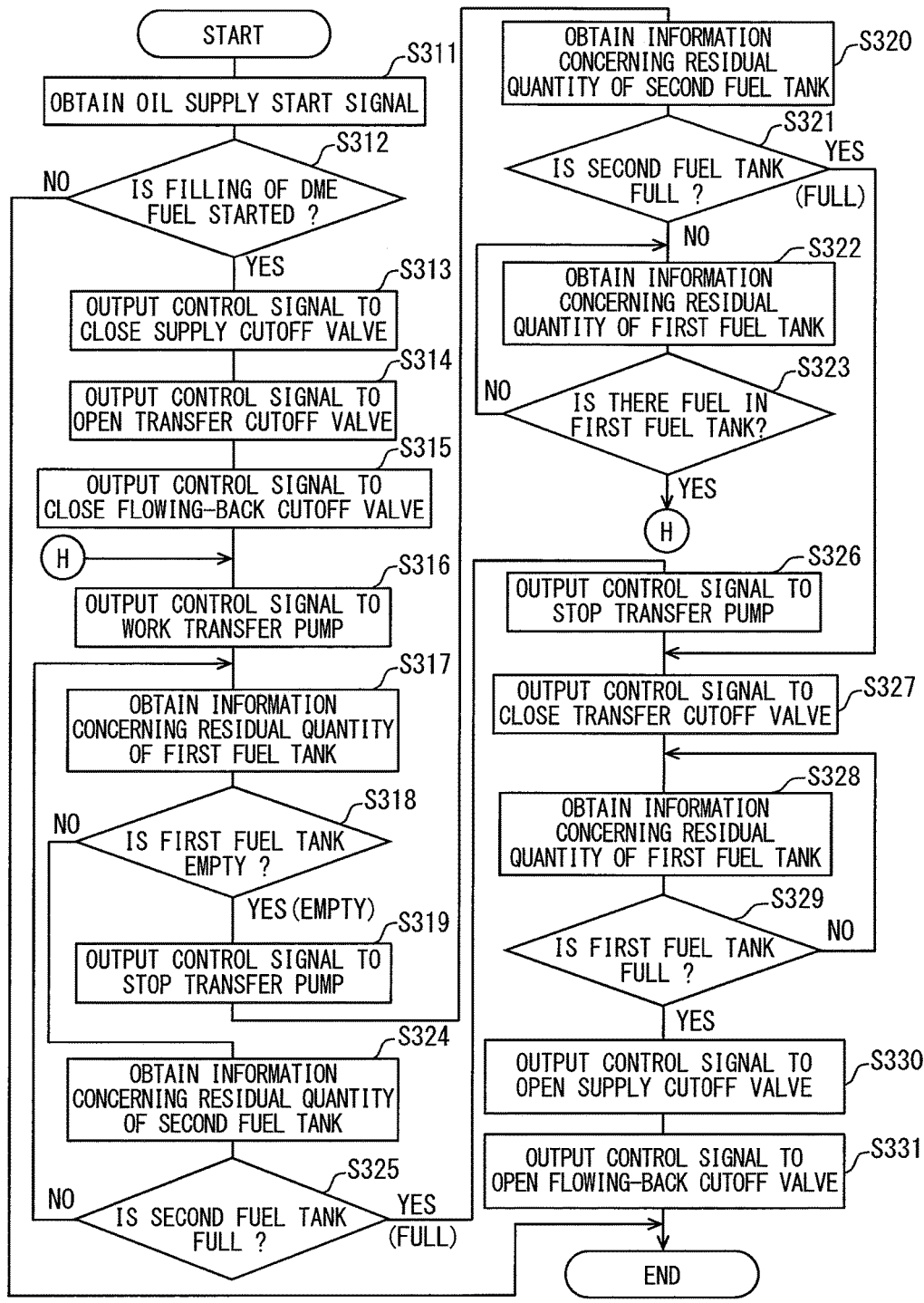
FIG. 10 is a flow chart of control process carried out at a time of refueling in the third embodiment.

The operation of the fuel tank system 300 at the time of refueling is explained. While the transfer cutoff valve 72 is made into the open state, at the time of refueling, the supply cutoff valve 71 and the flowing-back cutoff valve 77 are changed into the closed state. The DME fuel of the first fuel tank 90 is sent to the second fuel tank 190 by the operation of the transfer pump 310 under such a state. The details of the processing carried out by the control device 350 of the fuel tank system 300 are explained based on FIG. 10, referring to FIG. 8.

In S311-S315, substantially the same processing is carried out with S101-S105 of the first embodiment (refer to FIG. 2), and the processor progresses to S316. In S316, a control signal is outputted to the pump 310 to work the transfer pump 310, and the processor progresses to S317. The pressure of the DME fuel currently stored by the first fuel tank 90 is raised by the transfer pump 310, and the DME fuel is sent to the second fuel tank 190 in S316.

In S317 and S318, substantially the same processing is carried out with S107 and S108 of the first embodiment (refer to FIG. 2), and the processor progresses to S319. In S319, a control signal to stop the transfer pump 310 is outputted to the pump 310, and the processor progresses to S320. The transfer of DME fuel into the second fuel tank 190 from the first fuel tank 90 is interrupted or stopped temporarily based on the control signal outputted in S319. In S320-S325, substantially the same processing is carried out with S110-S115 of the first embodiment (refer to FIG. 2).

After it is determined that the second fuel tank is full in S325, a control signal to stop the transfer pump 310 is outputted in S326, similarly to S319, and the processor progresses to S327. In S327-S331, substantially the same processing is carried out with S117-S121 of the first embodiment (refer to FIG. 2), and a series of processings are ended.

According to the third embodiment, the same effect as the first embodiment is achieved. The difference between the pressure in the first fuel tank 90 and the refueling pressure of the DME fuel sent from the DME dispenser 1 can be secured. Therefore, the flow speed of the DME fuel to the first fuel tank 90 is raised quickly, and it becomes possible to shorten refueling time.

According to the third embodiment, a transfer of DME fuel into the second fuel tank 190 is performed during operation of the internal-combustion engine 110. Therefore, at the time of refueling, the first fuel tank 90 is substantially in an empty state, and refueling of DME fuel may be started. Therefore, the temperature and pressure in the first fuel tank 90 can be quickly lowered by evaporation latent heat, and it becomes possible to refuel DME fuel with high speed from immediately after a start of refueling.

According to the third embodiment, the residual quantity in the first fuel tank 90 is brought close to 0% as much as possible while the vehicle travels. Therefore, since the DME fuel currently stored by the first fuel tank 90 can be exhausted, it becomes possible to increase the mileage. Furthermore, the feed pump 360 of the third embodiment can independently supply the DME fuel for the internal-combustion engine 110 as needed. Therefore, sufficient amount of DME fuel can be supplied to the internal-combustion engine 110 while DME fuel is sent from the first fuel tank 90 to the second fuel tank 190 in the case where the vehicle is travelling. Therefore, the output of the internal-combustion engine 110 is not restricted.

According to the third embodiment, the return fuel is returned to the second fuel tank 190. Therefore, the temperature in the first fuel tank 90 is not raised because the return fuel with high temperature is not returned to the first fuel tank 90. Therefore, since sufficient pressure difference can be certainly secured immediately after a start of refueling, refueling time can be shortened.

In the third embodiment, the transfer pump 310 may correspond to a sending part, and the feed pump 360 may correspond to a feed section.

(Other Embodiment)

It should be appreciated that the present disclosure is not limited to the embodiments described above and can be modified appropriately within the scope of the appended claims. The embodiments above are not irrelevant to one another and can be combined appropriately unless a combination is obviously impossible.

In the first and second embodiments, the first feed pump that pumps the DME fuel from the first fuel tank to the internal-combustion engine sends DME fuel to the second fuel tank from the first fuel tank at a time of refueling. However, a pump which sends DME fuel to the second fuel tank from the first fuel tank may be prepared independently from the feed pump.

In the first and second embodiments, a part of the supply line which supplies the DME fuel from the first fuel tank to the internal-combustion engine serves as a part of the transfer line which sends DME fuel to the second fuel tank from the first fuel tank. However, the transfer line may form a fuel channel completely different from the supply line.

The control device determines the start of the refueling of DME fuel based on the refueling start signal from the refueling switch. However, the information for determining a refueling start is not limited to the operation on such a switch. For example, a refueling start may be determined based on having opened the refueling opening. Moreover, when the internal-combustion engine is suspended at a refueling station, the determination of refueling start may be made based on the position information such as GPS. Furthermore, under the state where fuel residual quantity is slight, when the internal-combustion engine is suspended, the determination of refueling start may be made.

In the first embodiment, two of the two-way valves, i.e., a supply cutoff valve and a transfer cutoff valve, correspond to a first switch part which changes the transfer line from an interception state to a communication state and which changes the first supply line from a communication state to an interception state. However, a three-way valve disposed at a transfer branch part may achieve the function of the first switch part. Similarly, a three-way valve disposed at the transfer unification part of the second embodiment may word as the second switch part which changes the second transfer line from an interception state to a communication state and which changes the second supply line from a communication state to an interception state. A check valve disposed at the return fuel line may regulate a flow of the DME fuel from the second fuel tank to the first fuel tank may. Furthermore, each cutoff valve 371, 72, 77 in the third embodiment are omissible if needed.

The return fuel line in the first and second embodiments may be connected only to one of the first fuel tank and the second fuel tank. The return fuel line in the third embodiment may be connected only to the first fuel tank, or may be connected to both the first fuel tank and the second fuel tank.

In the embodiments, two fuel tanks are formed separately. However, the first storage chamber and the second storage chamber that do not overlap with each other may be formed in a single fuel tank by dividing the space inside of the single fuel tank with a division wall. Moreover, the capacity of the first fuel tank may differ from the capacity of the second fuel tank. Furthermore, the refueling opening may be prepared in each of the first fuel tank and the second fuel tank.

In the embodiments, DME fuel is an example of liquefied gas fuel supplied to an internal-combustion engine by a fueling system. However, the liquefied gas fuel is not limited to DME fuel. For example, the liquefied gas fuel may be diesel fuel such as light fuel which contains DME as the main ingredient.

The function offered by the control device of the embodiment may be a functional block of a processor which executes a predetermined program, or may be realized by an integrated circuit for exclusive use. Alternatively, each function may be offered by a hardware or/and software different from the above.

In the embodiments, the present disclosure is applied to the fuel tank system which stores fuel to be supplied to the internal-combustion engine of a vehicle. The present disclosure is applicable not only to an in-vehicle internal-combustion engine but a fuel tank system which stores fuel to be supplied to an internal-combustion engine or external-combustion engine in a vessel, a railroad vehicle, and an airplane. Furthermore, the present disclosure is applicable also to a fuel tank system which stores fuel to be consumed by an internal-combustion engine or external-combustion engine for power generation.

Such changes and modifications are to be understood as being within the scope of the present disclosure as defined by the appended claims.

What is claimed is:

1. A fuel tank system that stores liquefied gas fuel to be supplied to an engine, the liquefied gas fuel being refueled to the fuel tank system by a fueling equipment, the fuel tank system comprising:
a first tank part having a connector portion connectable with the fueling equipment and defining a first storage chamber into which the liquefied gas fuel sent from the fueling equipment flows;
a second tank part defining a second storage chamber that stores the liquefied gas fuel separately from the first storage chamber;
a sending part that raises a pressure of the liquefied gas fuel stored in the first tank part and that sends the liquefied gas fuel to the second tank part; and
a determination part that determines whether a refueling of the liquefied gas fuel from the fueling equipment through the connector portion to the first tank part is started, wherein
the sending part starts sending the liquefied gas fuel from the first tank part to the second tank part based on a determination of the determination part that the refueling is started, and
the sending part sends the liquefied gas fuel from the first tank part to the second tank part to increase a difference in a residual quantity of the liquefied gas fuel between the first tank part and the second tank part when the determination part determines that the refueling is started.

2. The fuel tank system according to claim 1, wherein a flow rate of the liquefied gas fuel sent to the second tank part from the first tank part is larger than a flow rate of the liquefied gas fuel flowing into the first tank part from the fueling equipment.

3. The fuel tank system according to claim 1, wherein the determination part further determines whether the liquefied gas fuel remains in the first tank part, and
the sending part stops sending the liquefied gas fuel from the first tank part to the second tank part based on a determination of the determination part that no liquefied gas fuel remains in the first tank part.

4. The fuel tank system according to claim 1, further comprising:
a first supply line that forms a fuel channel from the sending part to the engine;
a first transfer line that forms a fuel channel from the sending part to the second tank part; and
a first switch part that changes the first supply line from a communication state to an interception state and that changes the first transfer line from an interception state to a communication state based on a determination of the determination part that the refueling is started.

5. The fuel tank system according to claim 4, further comprising:
a feed section that feeds the liquefied gas fuel stored in the second tank part to the engine;
a second supply line that forms a fuel channel from the feed section to the engine;
a second transfer line that forms a fuel channel from the feed section to the first tank part; and
a second switch part that changes the second supply line from a communication state to an interception state and that changes the second transfer line from an interception state to a communication state based on a determination of the determination part that the refueling is started, wherein
the feed section draws the liquefied gas fuel stored in the first tank part, and sends the liquefied gas fuel to the second tank part through the second transfer line based on a determination of the determination part that the refueling is started.

6. The fuel tank system according to of claim 1, further comprising:
a return fuel line that returns the liquefied gas fuel discharged from the engine as return fuel to each of the first tank part and the second tank part; and
a regulation part that restricts the liquefied gas fuel from flowing through the return fuel line from the second tank part to the first tank part when the sending part sends the liquefied gas fuel from the first tank part to the second tank part.

7. The fuel tank system according to claim 1, further comprising:
a feed section that feeds the liquefied gas fuel to the engine only from the second tank part, wherein
the sending part sends the liquefied gas fuel to the second tank part from the first tank part so that a residual quantity of the liquefied gas fuel in the second tank part becomes larger than a residual quantity of the liquefied gas fuel in the first tank part when the liquefied gas fuel is supplied to the engine by the feed section.

8. The fuel tank system according to claim 7, further comprising:
a return fuel line that returns the liquefied gas fuel discharged from the engine as return fuel to only the second tank part.

9. The fuel tank system according to claim 1, wherein the sending part includes a transfer line that connects the first fuel tank part and the second fuel tank part with each other, and a transfer pump disposed in the transfer line.

10. The fuel tank system according to claim 1, wherein the connector portion includes a refueling opening defined in the first fuel tank part for receiving the liquefied gas fuel from the fueling equipment.

11. The fuel tank system according to claim 1, wherein the sending part sends the liquefied gas fuel from the first tank part to the second tank part to increase a difference in a residual quantity of the liquefied gas fuel between the first tank part and the second tank part when the determination part determines that the refueling is started and that the first tank part is not empty and that the second tank part is not full.

* * * * *